United States Patent [19]
Bailey

[11] 3,889,525
[45] June 17, 1975

[54] VIBRATING WIRE METER
[75] Inventor: William V. Bailey, Lebanon, N.H.
[73] Assignee: The United States of America as represented by the Secretary of the Interior, Washington, D.C.
[22] Filed: Aug. 7, 1974
[21] Appl. No.: 495,347

[52] U.S. Cl. ............................ 73/67.2; 73/DIG. 1
[51] Int. Cl. .................................................. G01l 1/10
[58] Field of Search ........ 73/67.2, 67.3, 67.4, 32 A, 73/517 AV, DIG. 1

[56] References Cited
UNITED STATES PATENTS
3,583,225  6/1971  Wing .......................... 73/517 AV X
3,726,129  4/1973  Thorne ............................. 73/67.2

Primary Examiner—Charles A. Ruehl
Attorney, Agent, or Firm—Thomas Zack; Donald R. Fraser

[57] ABSTRACT

A device for measuring and displaying the natural frequency of a wire under tension by magnetically plucking the wire at a selected frequency for a first period and monitoring the mechanical vibrations during a second period. The selected frequency is manually adjusted until the monitored frequency is of sufficient amplitude to be tracked, at which point the selected frequency is electronically adjusted. The tracked frequency is displayed.

13 Claims, 12 Drawing Figures

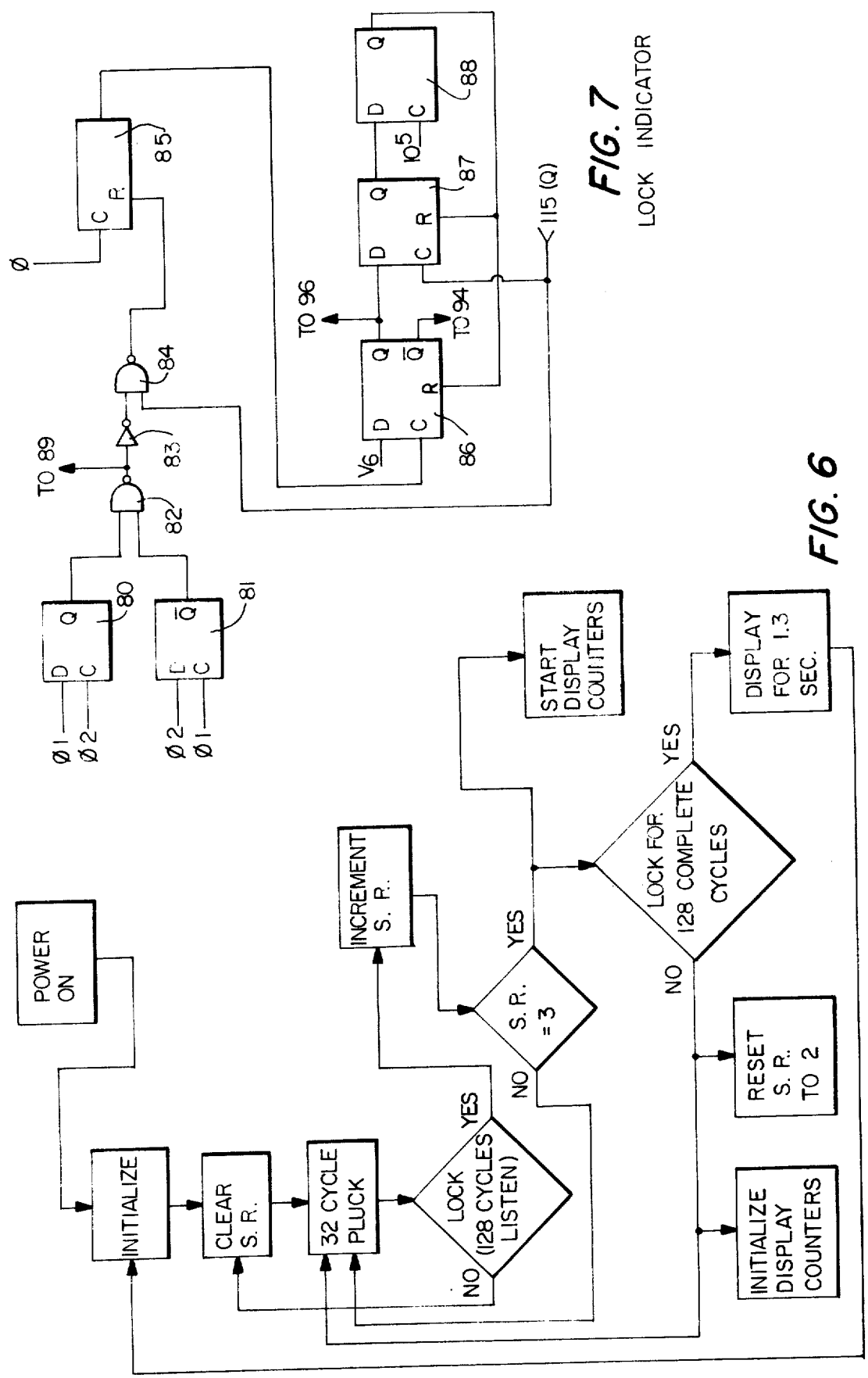

VIBRATING WIRE METER

BACKGROUND OF THE INVENTION

1. Field of the Invention:

The present invention relates generally to vibrating wire transducers and more specifically to meters for measuring and indicating the natural frequency of a wire under tension.

2. Description of the Prior Art:

Sensors for measuring loads (pressures, weights, stresses), displacements, strains or tilt generally use a vibrating wire, piezoelectric or resistance bridge type transducers. These sensors have been useful in mine safety, road and bridge safety, structural safety, truck weighing, earthquake monitoring, and mounting loads in cranes or booms, as well as many other environments.

Prior vibrating wire meters have displaced the wire of the sensor by a single voltage surge through a plucking coil and then counting and displaying the mechanical response. These systems are generally not intrinsically safe because of the high voltage required to pluck the coil with a single voltage surge. Similarly, these devices have not been able to pluck high tension wires of the type for which the present invention is designed to be used with.

A second type of vibrating wire meter involves plucking the wire by single voltage pulse and then comparing the resulting frequency of the vibration against that of standard wire built into the readout device. Comparison is done by generating Lissajous figures on an oscilloscope from the two vibrating wire elements. As with the previously described prior art device, the high voltage pulse required do not meet the U.S. Bureau of Mines intrinsic safety requirements. Also, the readout device is too bulky for routinely carrying around and requires a skilled operator to operate the readout device.

A third type of readout device vibrates the wire by a blocking oscillator and its natural frequency, as picked up by a second coil, is compared to that of a standard wire in the readout device. Tension of the standard wire can be tuned to that of the wire under examination by rotation of a knob on the instrument panel. The frequency matches when they audibly "beat." The required frequency can be read off the graduated scale of the knob. The system requires manipulation by a skilled operator to provide a truly accurate reading of a natural frequency of the wire under examination.

Existing vibrating wire transducers consist of a high tension wire clamped at its endpoints in a structure capable of movement or deflection. The tension of the wire is sufficiently high to insure that the natural frequency of vibration of the wire is between 100-10,000 Hertz. As the end points of the wire deflected, the tension of the wires are altered; subsequently, the natural frequency of vibration of the wire changes and is related to the deflection of the wire's end points. Thus, there is needed a readout instrument for determination of the natural frequency of the wire in the transducer located remote from the readout instrument. The readout instrument must provide the operator with a number related to the wire's natural frequency while meeting the intrinsic safety requirements of the U.S. Bureau of Mines.

SUMMARY OF THE INVENTION

The present device provides a readout of natural frequency of a wire under tension by electromagnetically plucking the wire with signal burst consisting of a number of cycles at a known frequency. The instrument then "listens" for response from the transducer. If the plucking frequency is near the wire's natural frequency, it will be set into vibration by resonance. If the plucking frequency is not near the wire's natural frequency, no response will be forthcoming. The instrument's operator must continue to tune the instrument to the wire by manually turning a knob. If a response from the wire transducer is forthcoming, phase-locked loops alter themselves to match their frequency with the frequency of the wire. When the loops "lock" onto the wire's frequency, another plucking signal burst is generated at the locked-in frequency of the phased lock loops. Each time the pluck-listen-lock-sequence occurs, the plucking frequency automatically tracks or homes in closer to the natural frequency of the wire.

The automatic tuning feature eliminates the need for a skilled operator because the phased lock loops act as noise filters to reject noise and detect signal errors such as "dropouts" or extra cycles. Spurious readings that arise from harmonics, noise or circuitry errors are thus eliminated. The operator need only turn a dial until a number appears on the digital display. This number is the period of the natural frequency of the wire. Also the phased locked loops in multiple plucking sequence eliminate the need for fine-tuning the readout instrument to the wire. An operator need only manually turn near the wire's natural frequency; the instrument automatically takes over from there.

The multiple cycle plucking requires smaller voltages and currents than the methods of prior devices. Thus the instrument is ideally suited for use in hazardous environments such as mines and thus meets the U.S. Bureau of Mine's intrinsic safety standards.

A voltage controlled oscillator having the manually adjustable center frequency provides the plucking frequency during the pluck period and is part of the phase lock loop circuit during the listen period. A storage element controls the voltage-controlled oscillator during a subsequent plucking period with the phased lock or stored signal of the previous listening period if the phase lock loop circuit was able to track the mechanical vibration during the listening period.

Digital circuitry is provided to produce a plurality of pluck and listen sequences to insure that the phase lock loops are tracking the natural vibration of the wire for sufficient period to be a true lock. A digital readout of the period of the wire's natural frequency is provided after the digital logic monitors the pluck-listen sequence, for example, for three pluck-listen sequences.

OBJECTS OF THE INVENTION

An object of the present invention is to provide a device for measuring the natural frequency of a wire transducer which meets U.S. Bureau of Mine intrinsic safety standards.

Another object is to provide instrumement which eliminates spurious or erroneous readings.

A further object of the invention is to provide an instrument which is easy to use and does not require a skilled operator.

Still another object is to provide a portable instrument for measuring the resonant frequency of a wire transducer having a digital readout and automatic finetuning features.

Other objects, advantages and novel features of the present invention will become apparent from the following detailed description of the present invention when considered in conjunction with the accompanying drawings.

BRIEF DESCRIPTION OF THE DRAWINGS

FIG. 6 is a logic flow diagram of the operation of the digital logic of the present invention;

FIG. 7 is a schematic of the digital logic of the lock detector and indicator;

DESCRIPTION OF THE PREFERRED EMBODIMENTS

Figure 1:
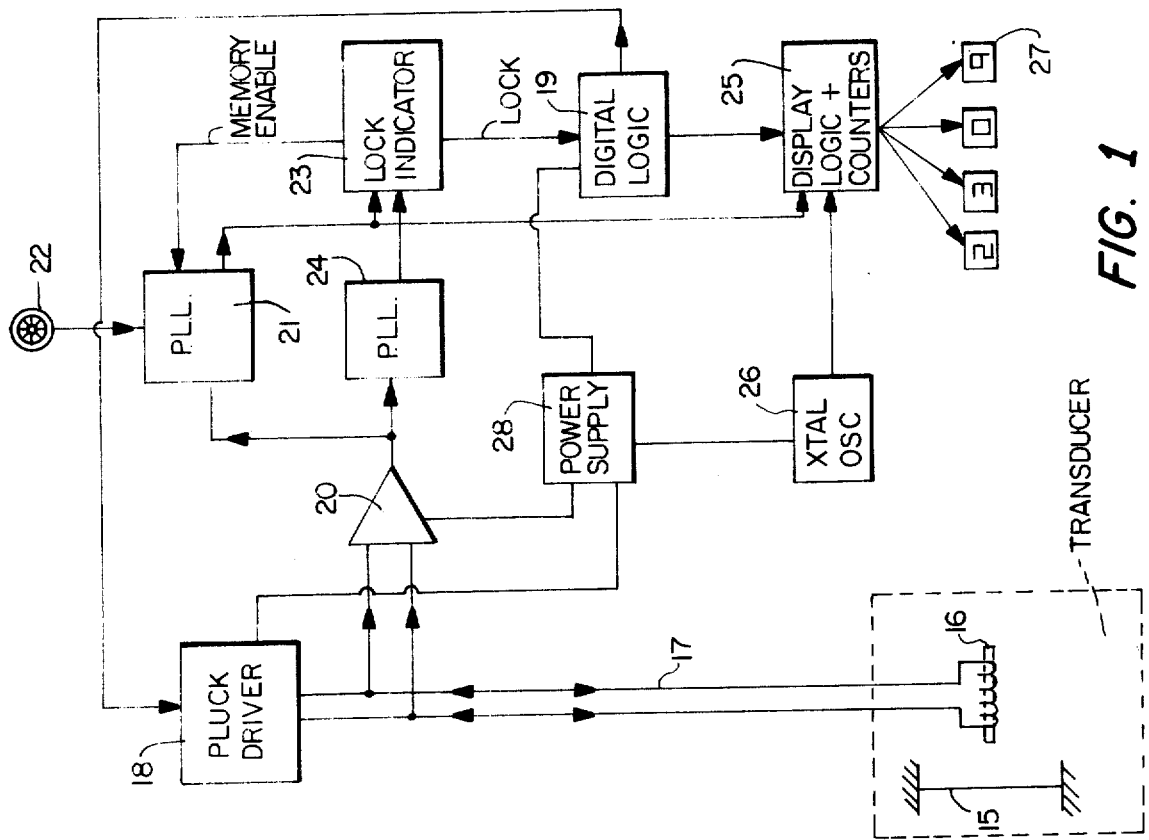
FIG. 1 is the block diagram of the preferred embodiment of the subject invention.

FIG. 1, which illustrates in a block diagram form a preferred embodiment of the present vibrating wire meter, shows a transducer comprising a wire 15 and an electromagnetic coil 16 at a remote location. The wire 15 of the transducer may be that which is presently used in mines, i.e. being short, for example, 0.780 inches, having a relatively large diameter, for example, 0.010 inches, and being under relatively high tension, for example, 80,000 psi. This wire geometry has distinctive vibration characteristics. Short wires exhibit higher damping than long wires and despite the damping, the "Q" of the wire is still high (300–500) which means the wires have a sharp resonance peak and only a small fraction of the energy in a single plucking pulse fed to the coil will be coupled to the wire. Also, since the wire is under relatively high tension, it suffers only a small amplitude when excited. The present invention drives the electromagnetic coil 16 on and off at a frequency which, if close to the natural frequency of the wire, will cause the wire to resonate. The natural frequency of vibration of the wire 12, as described above, will lie between 100–10,000 hertz.

The transducer is connected to the vibrating wire meter of the present invention by a pair of cables 17. The pluck driver 18 is connected to the cables 17 to amplify the plucking signal that it receives from sequence logic 19 and feeds it to the coil 16 in the transducer. A plurality of low voltage, low current pulses are transmitted to the coil 16. For the present application, 32 cycles of an oscillator's frequency are transmitted. Following each plucked period, a listen period is provided to monitor the mechanical vibration of the wire 15 after being plucked by the pluck driver 18.

Coil 16 is used as the pick up coil to measure the mechanical vibration of wire 15 and provides an input over cables 17 to an analog amplifier-detector 20. The amplifier-detector 20 contains a filter that removes 60 hertz noise and passes only frequencies between the 2,000–8,000 Hz range. This range is selected for the particular transducer used and may be varied depending upon the transducer that the present meter is designed to cooperate with. The amplifier-detector 20 detects signals of sufficient amplitude to provide a square wave to the phased lock loops.

A first phase lock loop 21 is a frequency feedback circuit that runs at a center frequency controlled by the operator through knob 22. The circuit also has the ability to adjust its frequency automatically, i.e., without operator intervention, to remember or store an input frequency, and to feed it out on command from the lock indicator 23. If the manually selected frequency which is transmitted to the coil is within ±2% of the wire's natural frequency, the first pluck signals will cause the wire to vibrate at a significant amplitude. The wire frequency is then stored by phased lock loop 21 and amplified and fed back to the coil for a second pluck sequence. The response to the second pluck is similarly stored and amplified and fed back yet again. In this way, the input signal tracks or "homes" onto the wire's natural frequency automatically without intervention from the operator. A second phase lock loop 24 is provided and, in combination with the lock indicator 23, trips the digital sequence logic 19 and also prevents spurious readings that coule result if the first phase lock loop 21 onto a harmonic of the fundamental frequency of the wire 15.

Phase lock loop 21 includes a voltage controlled oscillator which is used to transmit the plucking frequency to the pluck driver 18 during the pluck period and is used as part of the phased lock loop during the listen period. The stored tracked frequency of the first phase lock loop alters the voltage controlled oscillator's output without the operator's intervention to push the next plucking frequency near to the resonant frequency of the wire 15.

After the third successful pluck, the display logic and counter display logic 25 allows the counter therein to count. A high frequency crystal oscillator 26 provides a $10^5$ hertz signal for the display logic counters. If lock has been maintained for the total listening period, which for this application will be 128 cycles of the pluck signal, the counter of display logic 25 is displayed on a 4-segment display 27. The digital display appears with a flashing signal for a short period of time, for example under 2 seconds, after which the whole sequence of events is repeated and the reading is checked.

Figure 2A:
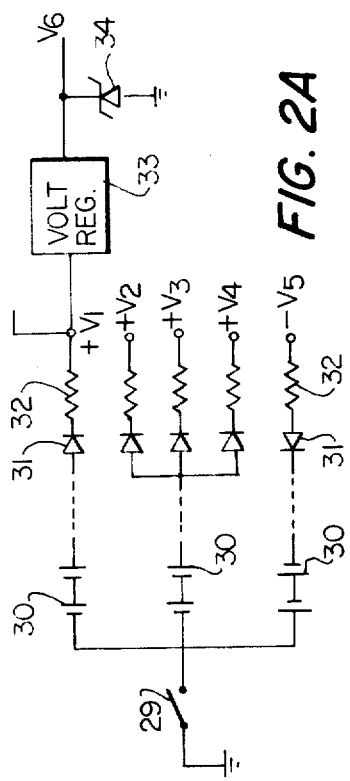
FIGS. 2a, 2b are schematics of the power supply.
Figure 2B:
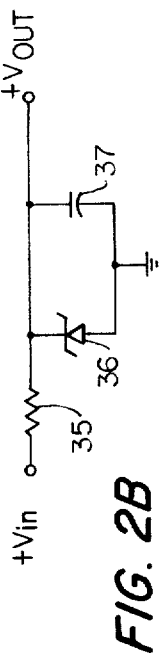

A power supply shown in block 28 in FIG. 1 is schematically shown in detail in FIGS. 2a and 2b. The power supply is connected to ground by the on and off switch 29 of the system. A plurality of DC power sources or batteries 30 arranged in a plurality of series circuits, each terminating with one or a plurality of diodes 31 and resistors 32. The diodes 31 provide protection for the meter circuitry from accidental reversal of the battery series circuits. The resistors 32 are required for limiting short-circuit current from the batteries in satisfaction of intrinsic safety requirements of the U.S.B.M. The power supply provides the direct current voltage levels for the meter and are indicated as $\pm V_{1-5}$ in the detailed schematics of the various subassemblies.

The terminal voltage $V_1$ is connected to a standard voltage regulator 33 to produce a regulated DC voltage $V_6$ for the digital logic. A zener diode 34 is provided to limit the value of $V_6$. A commercially available voltage regulator is the LM 309L.

Also included in the power supply 28 are five zener diode-resistor-capacitor circuits as illustrated in FIG. 2b to provide five voltage levels $\pm V_7$, $\pm V_8$ and $V_9$ to be used in the analog amplifier-detector circuits. Three separate circuits having an input of $+V_4$ provide a positive voltage $+V_7$, $V_8$ and $V_9$, include input resistor 35, zener diode 36 and capacitor 37 connected as shown in FIG. 2b. The negative voltages $-V_7$ and $-V_8$ are produced by reversing the polarity of zener diode 36 and capacitor 37 and using voltage $-V_5$ as the input. Though using a common number 36 for the zener diode, it should be noted that the zener diode may be varied to produce different voltage levels as required.

Figure 3:
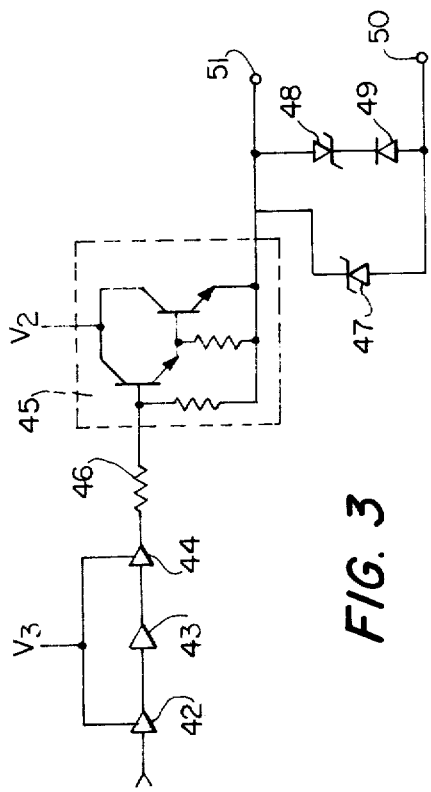
FIG. 3 is a schematic of the digital logic for the pluck driver.

The pluck driver 18, as illustrated in detail in FIG. 3, converts the low power, low current pluck signal to a higher voltage, higher current pluck drive pulse. A voltage shifter comprising digital logic buffers 42, 43 and 44 transmits the logic pluck pulse to a Darlington amplifier 45 through a current limiting resistor 46. Zener diode 47 is connected across the output of Darlington amplifier 45 to limit the output voltage. Zener diode 48, which speeds up the inductive decayed time of the electromagnetic coil 16, and diode 49 are connected in series across zener diode 47 to eliminate inductive kickback from the electromagnetic coil 16. Output terminals 50 and 51 are connected to cables 17 which transmit and receive the electrical signals to and from the remote transducer.

Figure 4:
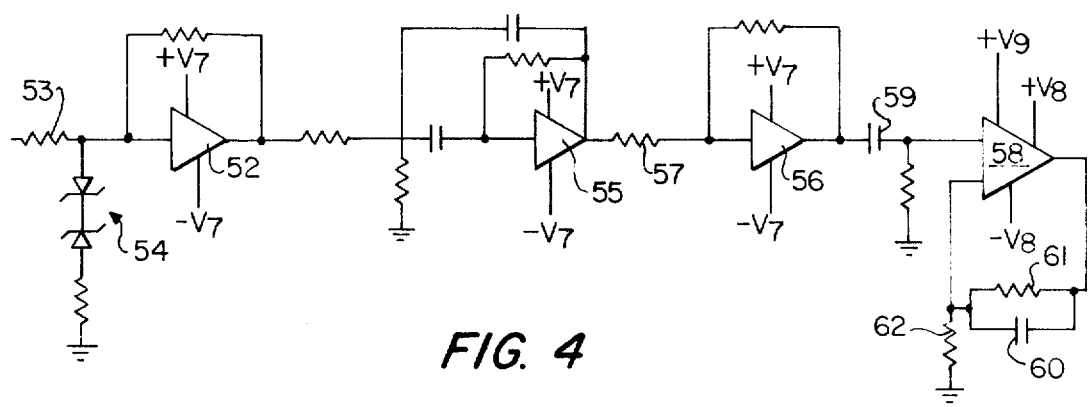
FIG. 4 is a schematic of the analog amplifier-detector.

The analog amplifier-detector 20, as shown in detail in FIG. 4, consists generally of an amplifier section, a filter section and a comparator section. The input amplifier 52 is DC coupled to the electromagnetic coil 16 via cable 17 through resistor 53 and zener diode clipper 54. The filter section is AC coupled to amplifier 52 and includes an operational amplifier 55 having multiple feedback elements to provide a bandpass which is characteristic of the frequency of vibration of wire 15 so as to eliminate extraneous signals and noise. Amplifier 56 is DC coupled to the filter through resistor 57. The comparator 58 is capacitively coupled to amplifier 56 by capacitor 59. The hysteresis network consisting of capacitor 60 and resistors 61 and 62 is provided to stabilize the comparator 58. Additional stability is provided by powering the amplifiers and the filter by voltages $\pm V_7$ and the comparator by voltages $\pm V_8$ and $\pm V_9$. The analog amplifier-detector amplifies the electrical signal representing the vibration of the wire, filters the noise, and provides a pulse train of the vibration of sufficient amplitude to be tracked by the phased lock loop circuits.

The phased lock loops 21 and 24 of FIG. 1 are multipurpose circuits acting as noise filters, signal dropout and error detector and a self-adjusting oscillator. Phase lock loop 21 includes a voltage controlled oscillator whose frequency can be adjusted manually by turning knob 22 which adjusts the potentiometer. When the voltage controlled oscillator (VCO) has been adjusted close enough to wire 15's natural frequency, thus providing a returned signal from the transducer, the oscillator is automatically adjusted to the wire's resonant frequency electronically. Phase lock loop 21 is relatively sensitive and will track or lock onto the frequency of the wire 15 if it produces a signal of sufficient amplitude.

The frequency of the voltaged controlled oscillator of PLL 21 will correspond directly to that of the wire 15 unless the oscillator is at a super or subharmonic of the wire's frequency. If this occurs, PLL 21 will lock onto the signal, but with an exact fraction or multiple of the wire's frequency. For example, if the wire's resonant frequency was 6,000 Hz, it could be excited by 3,000 Hz signal. PLL 21 might lock onto the 6,000 Hz signal, but instead of having an output frequency of 6,000 Hz, it would have an output of 3,000 Hz. When PLL 21 is in lock, it operates as a bandpass filter with adjustable band-width whose frequency can be varied manually by knob 22 or electronically by phase lock loop circuitry. Thus, the output of PLL 21 is used by the digital circuitry for all subsequent logic and display counting.

Phase lock loop 24 is used to detect noise and detect those situations when phase lock loop 21 has locked onto a sub or superharmonic. PLL 24 is sensitive to signal transition and can detect very narrow pulses that might not effect PLL 21 as an error, but nevertheless represent an input signal degradation. Thus, it provides a very good means for monitoring the quality of the signal from the transducer. PLL 24 does not permit harmonic locking. Thus, when it is in lock, its output will be faithful representation of its input.

Phase lock loop is discussed in some length in an article entitled "The Monolithic Phase-Locked-Loop-A Versatile Building Block" by A. B. Grebene in IEEE Spectrum, Mar. 19, 1971, pp. 38–49. Phase lock loops generally include a phase detector, a low pass filter, and a voltage controlled oscillator. Phase lock loops 21 and 24 include these three basic components having different specifications and characteristics to perform the functions enumerated above. PLL 21 and 24 are CD4046AE (Ref ICAN-6101) available from RCA, whose characteristics and design are found in COS/MOS Digital Integrated Circuits, 1973 Edition, pages 319ff. PLL 21 is designed using Table IV "Phase Comparator I, VCO with Offset" and PLL 24 is designed from Table IV "Using Phase Comparator 2, VCO with Offset."

Figure 5A:
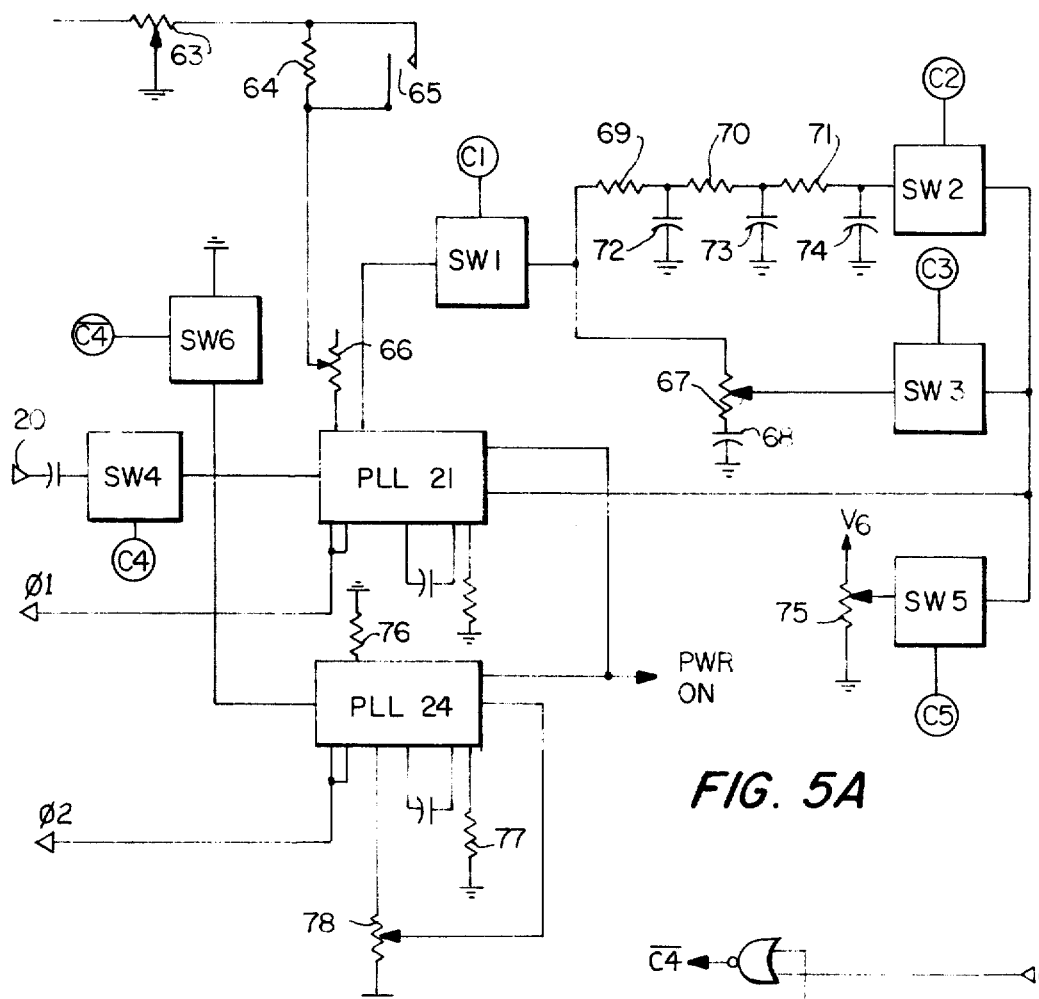
FIGS. 5a and 5b are schematics of the two-phased lock loop circuits.

PLL 21 and 24, as shown in FIG. 5a, are connected to the analog amplifier-detector 20 through a switch SW4. Also connected to the inputs of PLL 21 and PLL 24 through a switch SW6 is ground. The frequency of the voltage controlled oscillator of PLL 21 is adjusted by knob 22 acting on resistor 63, which is in series with resistor 64, which is shunted by range switch 65, and with a variable resistor 66. Also connected to the voltage controlled oscillator of PLL 21 is a rough low pass filter having resistor 67 and capacitor 68 and a fine-smoothing low pass filter comprising resistors 69, 70 and 71 and capacitors 72, 73 and 74 through switches SW3 and SW2, respectively. Switch SW1 is connected between the phased detector and the low pass filter to close the feedback loop so that the voltage controlled oscillator of PLL 21 is part of the phased lock loop. When switch SW1 is open, the voltage controlled oscillator is used as an oscillator source. Variable resistor 75 is also connected in the input of voltage controlled oscillator through switch SW5. It should be noted that the fine low pass filter also functions as the storage device for storing or remembering the tracked or locked frequency as is to be discussed fully hereafter.

Figure 5B:
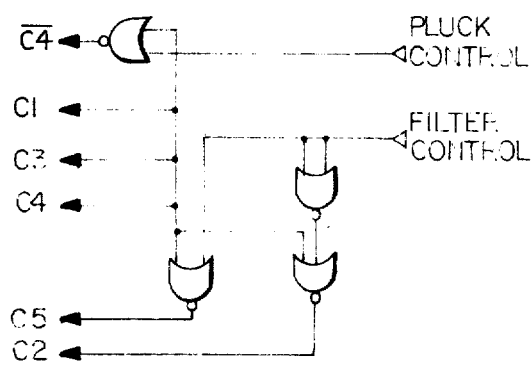

Resistors 76 and 77 of phase lock loop 24 determine the upper and lower loop frequencies. Resistor 78 and capacitor 79 form the low pass filter. The logic circuit of FIG. 5 provides the controls for switches SW1 through SW6 and responds to the pluck-listen control and the filter control signal from the digital sequencing logic 19 of FIG. 1 to be explained in more detail in later Figures. The switches may be transistors or semiconductors which are preferred, or they may be simple relays.

The operation of FIG. 5 is as follows: During a normal pluck (lock was not achieved on the previous pluck), PLL 21 acts like an oscillator whose frequency is determined by manually adjusted resistor 63. The input to PLL 21 and 24 is disabled by SW4. The feedback loop of PLL 21 is opened by SW1, SW2, and SW3. SW5 is closed to allow the voltage at the center tap of resistor 75 to control the VCO frequency. This tap is adjusted so that the center voltage is equal to $V_6/2$. The VCO output will now be a square wave with a 50% duty cycle, whose frequency is adjusted by resistor 63.

If the feedback loop is closed, i.e., SW1 and SW3 are closed and SW5 open but no input signal is applied to the loop, PLL 21 will oscillate at a frequency equal to the frequency obtained if the input signal to the VCO is equal to $V_6/2$; however, the duty cycle will not be 50%. This is why during a pluck, the feedback loop is open and a voltage equal to $V_6/2$ from resistor 75 is applied to the VCO.

During a listening period, SW4 is closed and any output from the analog amplifier-detector is allowed to alter the two phase lock loops. SW1 and SW3 are closed so that the feedback loop is closed and SW2 and SW5 are open so they have no effect on the circuit. The phase comparator output from PLL 21 is filtered roughly by resistor-capacitor 67 and 68 for use in the feedback loop. This output is also filtered in a special fine smoothing filter whose output is equal to the average voltage from resistor-capacitor 67, 68 minus all the ripple. The rough filter is necessary for fast loop response and the smoothed voltage from the fine smoothing filter represents the instantaneous frequency of PLL 21.

If lock with the signal from the amplifier-detector is obtained, the output frequency of the phase lock loops will be identical to the input signal. This frequency is to be stored for the next pluck. Thus the output voltage from the "fine" filter, which represents the instantaneous VCO frequency, is retained or stored by the filter and used to provide the input voltage to the voltage controlled oscillator during the next pluck.

Pluck, which is indicated by a logic 0 at the pluck-listen control input, opens switches SW4, SW1, SW3, SW2 and closes switches SW6 and SW5. But when lock is indicated by logic 1 as the filter control switch, SW2 closes and SW5 opens. Thus the fine filter stores the tracked voltage of the VCO and is used to drive the VCO during the next pluck sequence.

DIGITAL LOGIC

The logic, including lock indicator 23, digital sequencing logic 19 and display logic and counter 25 provides all the control functions for the meter circuit, including error detection, "automatic" tuning, "pluck-listen" sequencing, display counting, display driving and timing.

The logic is responsible for generating a 32-cycle pluck (the plucking frequency determined by the manual adjustment of the TUNE knob 22, the RANGE switch 62 and PLL 21. Following the pluck period, the logic circuit must decide whether or not any return signal from the transducer is valid and can be considered countable data. The validity is insured when both phase locked loops PLL 21 and 24 are locked to the incoming signal. This condition is tested for by the logic circuitry. The period when the circuitry awaits the response of the transducer is called listen, it is equal to 128 counts or cycles of the signal from PLL 21 (the plucking frequency).

Following a successful lock, the circuitry stores or remembers the frequency of the signal from the transducer and returns that frequency back to the transducer on the next pluck. This provides a guarantee that the following plucking frequency will be nearer the wire's natural frequency. Thus the digital logic circuit along with the phase locked loops is somewhat self-adjusting.

To guarantee that the plucking and wire's natural frequencies are as close as possible, the pluck-listen sequence occurs more than once. Following a third successful pluck, the circuitry listens for an additional 128 cycles of the plucking sequence. During this interval, display counters count the first 100 of these cycles while the MOSTEK counters simultaneously count the cycles from the $10^5$ Hz oscillator 26. Thus, the time duration of 100 cycles from the transducer is represented by the number of cycles from the $10^5$ Hz oscillator 26 retained in the MOSTEK display counter. The logic is designed to insure that exactly 100 cycles of the unknown wire frequency are counted.

The circuitry is reinitialized if lock is not achieved during the 128 cycle Listen. This is the dominant mechanism for clearing the logic: if two successive locks are achieved and failure to achieve lock occurs on the third listen, all the circuitry is initialized and three successive locks must now be achieved. If, however, the third lock is successful but the lock is not maintained for an additional 128 cycles (during which time the display counters are operating), the circuitry will initiate another pluck but not initialize the system. As long as another lock is achieved within 128 cycles, the circuitry will retain this pluck as the third, until a failure to obtain lock occurs or a full additional 128 counts are achieved. The number of additional checking cycles $128 = 2^7$ insures that the 100 cycles during which display counting occurs are free of noise plus a wide margin of cycles (28 more) are also free of noise.

Thus, the use of analog filtering, then two phase-locked loops, both of which must achieve lock, three successive lock-listen sequences and a 128 cycle check all contribute to a reading which is to be trusted.

FIG. 6 is a flow diagram showing the entire sequence of events that can occur for any type of lock-listen sequence. It can be explained as follows:

The circuitry is initialized either at the end of a readout display or when the power is turned on. The initialization clears, among other logic elements, a three element shift register which counts the number of successful locks from the lock indicator.

The first 32 cycle pluck is generated and, during the first listen period, the logic waits for 128 cycles for the two loops to lock. If the lock is not achieved within the 128 cycle listening period, the shift register is cleared and another 32 cycle pluck is generated. If lock is obtained, another 32 cycle pluck will occur immediately and the shift register is incremented. Following the second pluck is another listening period until lock occurs. If it occurs within the 128 cycle time period, the shift register is incremented and a third pluck is generated. If not, the circuit is reinitialized. If lock does not occur following the third pluck as before, the circuit is reinitialized. If lock does occur during the third listen period, both the 100 cycle unknown-frequency counter and the MOSTEK counter are enabled for counting. If lock is not maintained for 128 cycles, the display counter is cleared, the shift register is reset to two and the third pluck is generated again. If lock is maintained for 128 cycles, blanking is removed from the digital display and the contents of the MOSTEK counters is displayed. This number is displayed for 1.3 seconds following which the system is initialized and the first pluck generated and is the inverse of the natural frequency of the wire or its period. The detailed logic required to perform the above process is described in detail hereinafter.

PHASE LOCK INDICATOR 23

The outputs $\phi 1$ and $\phi 2$ of PLL 21 and PLL 24, respectively (as shown in FIG. 5), are monitored by the lock indicator circuit 23. If $\phi 1$ and $\phi 2$ are observed during proper lock, the waveforms will be out of phase, $\phi 1$ will lag $\phi 2$ by phase margin related to how near the driving frequency is to the end of the capture range. If the driving frequency is in the center of the range, the lag will be 90°. As the driving range deviates towards either extremity of the capture range, the phase difference will be 0° or 180°.

As shown in FIG. 7, the inputs $\phi 1$ and $\phi 2$ from the phase lock loops are phase compared in two D-type flipflops 80 and 81 whose outputs are connected to NAND gate 82. The phase comparator rejects harmonics and provides a logic 0 at the output of NANDgate 82 when $\phi 1$ lags $\phi 2$ during the normal lock. It should be noted at this point that all flipflops are D-type flipflops unless otherwise noted.

Figure 8:
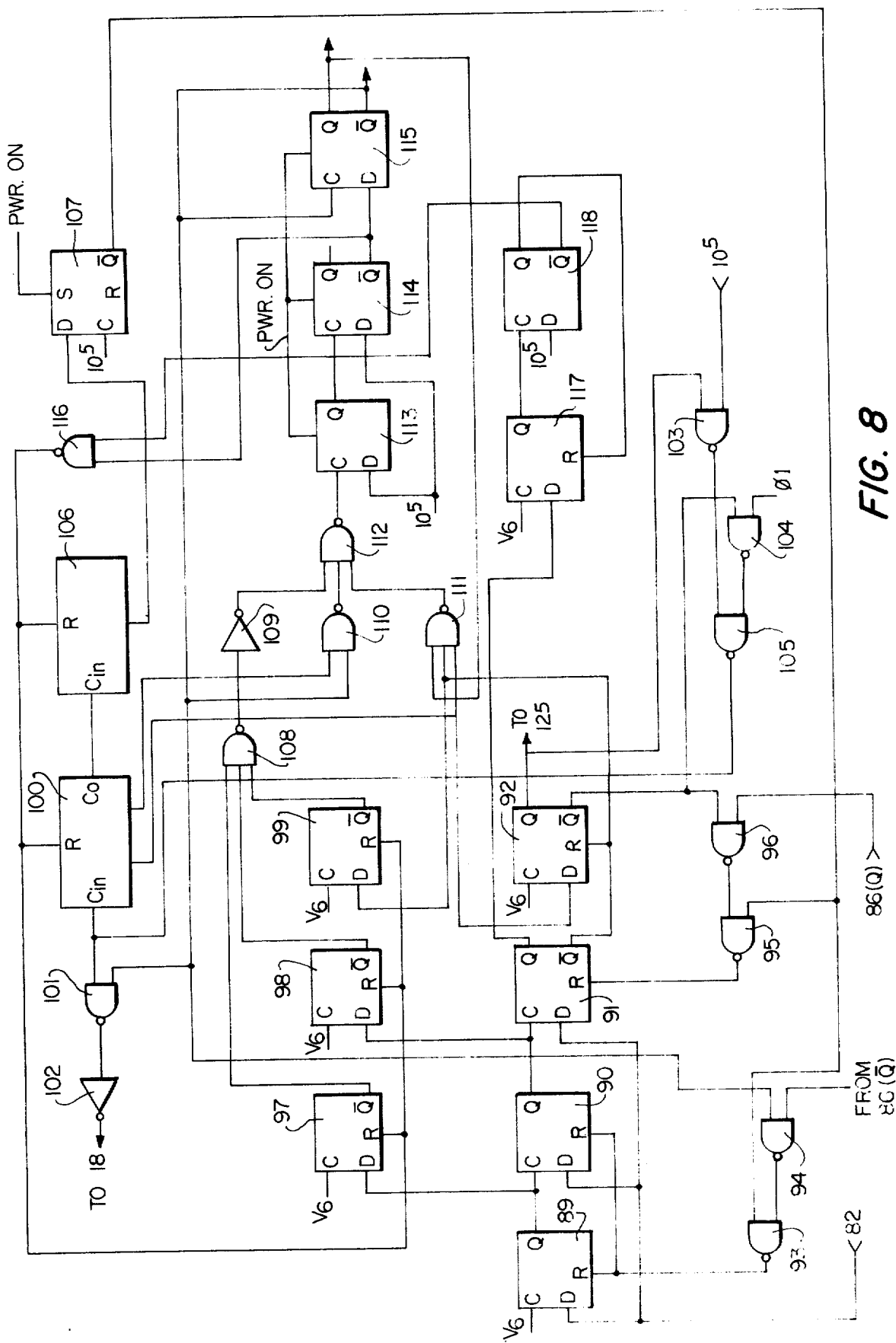
FIG. 8 is schematic of the digital sequencing logic.

The lock indication from NANDgate 82 is an inverted by 83 and provides an input to NANDgate 84 whose other input is the listen control signal from $ff115$ (FIG. 8). Counter 85 is a binary divide-by 128 counter for counting the signal $\phi 1$. During the listening period, lock must be obtained within a 128 cycle period of $\phi 1$ and held continuously for 64 of these cycles. If lock is lost during counting, gates 82, 83 and 84 will reset the counter 85 to 0.

Flipflop 86 serves as a leading edge triggered memory element, remembering if counter 85 has successfully counted to 64. Its Q output increments the lock-counter shift register 96 (FIG. 8) to be described later, and its $\overline{Q}$ output is used to clear the first two shift register elements. Flipflops 87 and 88 serve as a synchronous (with $10^5$ Hz local oscillator) monostable edge triggered by the listen control signal from ff115 (FIG. 8). The Q output of flipflop 88 clears flip-flops 86 and 87 following the end of a pluck period.

LOCK COUNTER-SHIFT REGISTER

The lock counter-shift register includes flipflops 89, 90, 91 and 92 wherein 89, 90 and 92 form the lock counter. The third flipflop 91 is cleared independently of $ff$'s 89 and 90 from Q of $ff86$ (lock indicator memory) through the two NANDgates 95 and 96. The first two $ff89$ and 90 are cleared by the line from $\overline{Q}$ of $ff86$ through the two NANDgates 93 and 94.

The fourth flipflop 92 forms the Master Display Memory. If a logic 1 appears at Q of $ff92$, the display is unblanked, thus displaying the digits stored in the MOSTEK buffer memory.

The display counting is started by the 0–1 transition of Q of $ff91$. This resets $ff92$ and Master Counter 100.

SHIFT REGISTER BUFFER MEMORIES

Flipflops 97, 98, 99 each serve as leading edge-triggered buffer memories for the three shift-register memories 89, 90 and 91.

They store the presence of a transition until reset by the synchronous "monostable" pulse formed by flipflop 114 through NANDgate 116.

MASTER COUNTER

Master counter 100 is a $\div 2^{14}$ counter, with taps at $\div 2^8$ and $\div 2^6$ to count out 128 cycles and 32 cycles, respectively. This counter determines the length of the Pluck (32 cycles), the Listen (128 cycles), the third Pluck lock check (128 cycles), and the digital display time (along with counter 106, equals $2^{17}\ 10^5$ Hz cycles $\approx 1.3$ seconds).

The proper tap is selected by NANDgates 110 and 111, which are in turn controlled by the listen (Q) output of the Master flipflop.

The frequency of the input to the counter 110, whether it be the output of $\phi 1$ during listening and plucking or $10^5$ Hz during display timing, is controlled by the three NANDgates 103, 104 and 105, which are in turn controlled by the Master Display Memory 92.

The Master Counter 100 is reset by the Master Monostable 114 through the NANDgate 116 in the same way as the shift register buffer memories 97, 98 and 99.

MASTER FLIPFLOP

The master flipflop 115 is wired as a $\div 2$ counter whose outputs determine whether or not the circuit is in a listen or pluck mode. When Q is a logic 1, it is in a listen mode, and when $\overline{Q}$ is logic 1, it is in a pluck mode. Lines from Q and $\overline{Q}$ select the proper tap from Master Counter 110 through NANDgates 110 and 111. A transition from 0–1 at Q triggers the lock indicator monostable 87, 88 (See FIG. 7).

FF 115 is also responsible for gating the 32 cycle pluck to the pluck driver 18 power amplifier through NANDgate 101 and inverter 102.

MASTER MONOSTABLE

The master monostable includes flipflops 113 and 114. If the gated $\div 2^8$ tap from 100 or the gated $\div 2^6$ tap from 100 or any of the shift buffer memories 97, 98, 99 makes a transition from –1, 0–1 or 1–0, respectively, the transition is delayed for 1 $10^5$ Hz cycle and a monostable-type pulse for 2 $10^5$ Hz cycle is generated by 113Q and 114Q.

The three triggering transitions are or-ed by NANDgate 112.

The monostable pulse resets Master Counter 100, counter 106 and the shift register buffers 97, 98, 99. It toggles ff115, thus providing the means by which the flipflop changes the circuitry from pluck mode to listen mode and vice versa.

MONOSTABLE

D flipflops 117 and 118 form a monostable similar in operation to the lock-indicator monostable (ff 87, 88, FIG. 7). It is triggered by a 0–1 transition of 91Q which occurs following the third lock. Its output pulse resets master counter 100, thus preparing it for making the 128 cycle lock check. This pulse is or-ed at NANDgate 116, thus providing a reset pulse to 100 without toggling ff115 into a plucking mode.

MONOSTABLE CIRCUIT INITIALIZE

When the 1.3 sec display time has elapsed, counter 106 output goes from 0 to 1, thereby causing $\bar{Q}$ of initializing ff107 to go from 1 to 0 in synchronism with a leading edge from the $10^5$ Hz oscillator. The 0 at $\bar{Q}$ resets $\bar{Q}$ of ff91 from 0 to 1 and Q of 89 and 90 from 1 to 0 through the gates 93, 94, 95 and 96. This 0 to 1 transition of 91 $\bar{Q}$ toggles shift register buffer 99 from 1 to 0 causing a 0 to 1 transition at the Master Monostable 113, 114. The Master Monostable pulse resets counters 100 and 106 and the shift register buffers 97, 98, 99, thereby resetting the output of counter 106 back to a 0, propagating a 1 to ff107 on the next $10^5$ Hz leading edge, and returning the circuitry back to a plucking mode by the Master Monostable pulse which toggles 115Q to 1. The entire circuit has been initialized.

100 CYCLE DISPLAY COUNTER

Figure 9:
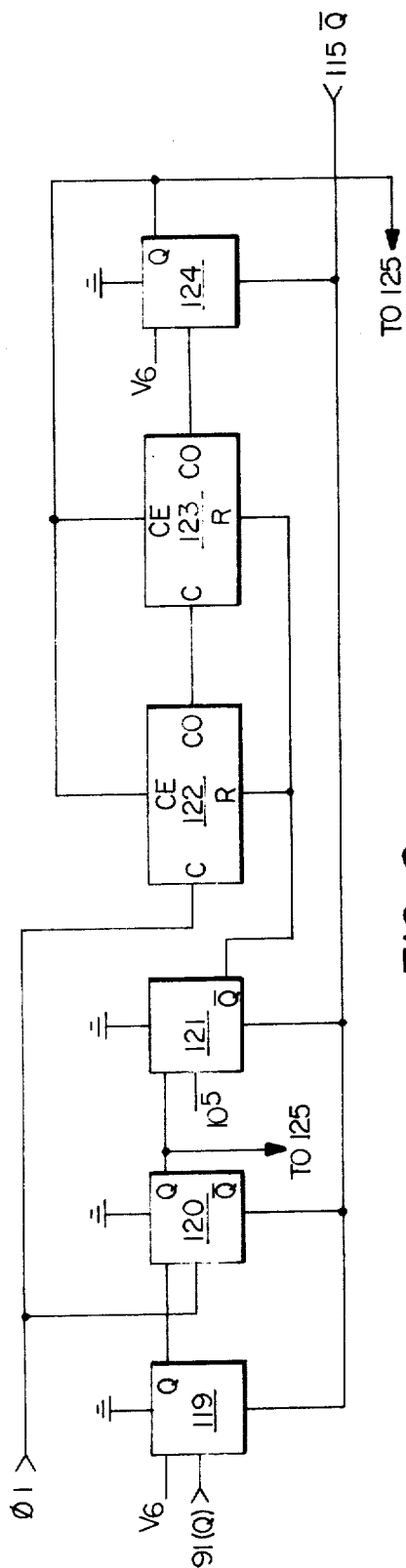
FIG. 9 is schematic of the 100 cycle display counter.

The 100 cycle display counter, illustrated in FIG. 9, provides a 1 at Q of ff119 upon two type-D flipflops. The 0 to 1 transition of 91Q, which also resets counter 100 for a 128 cycle lock check. This 1 is propagated to Q of ff120 by the leading edge of the unknown - frequency signal from PLL 1 ($\phi$1). This 1 is used to enable the MOSTEK $\div 10^4$ counters, thus synchronizing the MOSTEK counters to the lead edge of the unknown frequency signal.

The 1 that propagated from 120Q propagates to a 0 to $\bar{Q}$ of 121 after a random time delay determined by the phasing of the $10^5$ Hz oscillator. This minute delay prevents a possible race condition that would cause the loss of the first cycle in the 100 cycle count.

Two $\div 10$ counters 122 and 123, together count 100 cycles of $\phi$1. Their counting is enabled by 121 $\bar{Q}$ and is terminated when they toggle memory Q of flipflop 124 to a logic 1.

When 124Q makes a 0 to 1 transition on the 100th count, the 1 at $V_6$ propagates to 124Q. The 0 to 1 transition causes the Transfer input of the MOSTEK to transfer the count in the $\div 10^4$ counter into internal buffer registers. It is the contents of these registers that are displayed if and when the Master Display Memory 92Q removes the blanking from the MOSTEK display circuitry following a successful 128 cycle lock check.

The entire 100 cycle Display Counter is reset during a pluck 115Q.

POWER ON SEQUENCE

The power-on sequence involves an RC circuit which provides a logic 1 for a short period of time to activate the initialization logic including ff 107, 113, 114 and 115.

MOSTEK COUNTER

Figure 10:
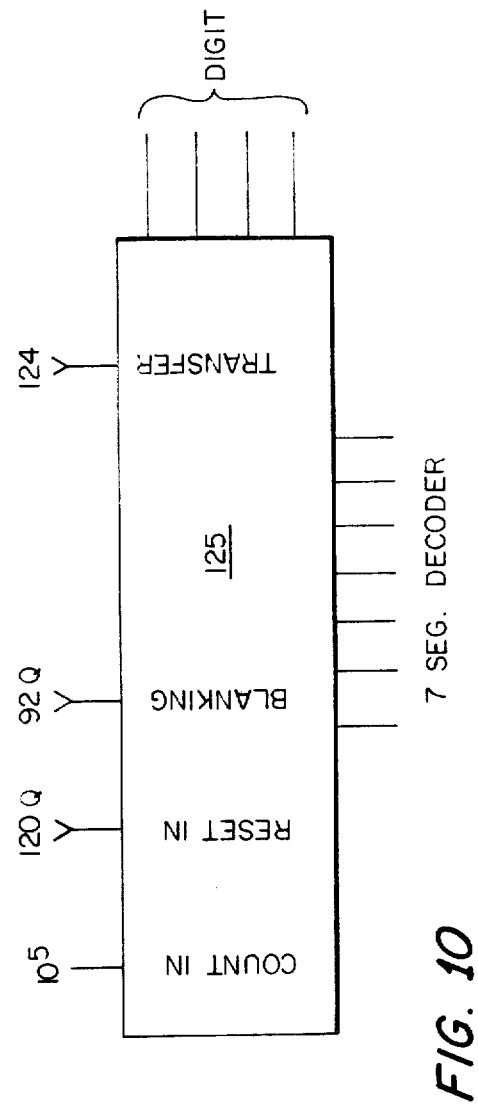
FIG. 10 is a block diagram of the connections of the display counter.

The MOSTEK counter 125 as shown in FIG. 10 is a p-channel FET LSI circuit available from the MOSTEK Corporation. The circuit starts counting the $10^5$ Hz input from the crystal oscillator on command from 120Q in its four $\div 10$ counters. On command from 124Q, the contents of these counters are transferred to the MOSTEK's internal buffer registers. When blanking is removed on command from 92Q following a successful 128 cycle lock check, the contents of the registers is displayed by their decoding to seven segment numeric readouts, strobed from the most significant to the least significant digit. A LED digital display is used because of its lower power requirements, which add to the meter's intrinsic safety.

As can be seen from the discussion of the detailed circuits, the present meter uses digital logic, an analog amplifier, two phase lock loops to provide an intrinsically safe meter for reading a natural frequency of a wire under tension. It is evident that the objects of the invention are obtained and, although the invention has been described and illustrated in detail, it is to be clearly understood that the same is by way of illustration and example only. The commercially available products listed above are examples of off-the-shelf items which perform the functions desired and are not to be taken by way of limitation. The spirit and scope of this invention are limited only by the terms of the appended claims.

What is claimed:

1. A system for measuring the natural frequency of a wire under tension by plucking the wire using a coil comprising:
    means for driving said coil at a given frequency for a first period;
    means manually adjustable for selecting said given frequency for driving said coil;
    means connected to said coil for detecting vibration of said wire above a given amplitude during a second period;
    means connected to said vibration detecting means for tracking the frequency of said detected vibrations within a given range of said given frequency;
    means connected to said tracking means for detecting tracking;
    means interconnecting said driving means and said tracking means for determining in response to said tracking detecting means whether said given frequency is to be the manually selected frequency or the tracked frequency in a subsequent first period; and
    means for displaying said tracked frequency.

2. The system of claim 1 including means connected to said determining means and said display means for controlling said display means to display said tracked frequency if tracking has been detected during at least two consecutive second periods.

3. The system of claim 2 wherein said display means includes first means for counting a fixed number of cycles of said tracked frequency, means for generating a clock pulse, second means for counting said clock pulse until said first counting means reaches said fixed number and means for displaying the final count of said second counting means.

4. The system of claim 3 wherein said display control means includes means for activating said first and second counters if said tracking has been detected during three consecutive second periods and means for activating said final count display means if tracking is maintained for at least said fixed number of cycles of said tracked frequency.

5. The system of claim 1 wherein said tracking means includes a first phase lock circuit having a voltage controlled oscillator, said manual selection means controlling the center frequency of said voltage controlled oscillator.

6. The system of claim 5 including means connected to said first phase lock circuit for storing said tracked frequency for application as said given frequency during said subsequent first period if chosen by said determining means.

7. The system of claim 5 including means connected to said voltage controlled oscillator for disconnecting said voltage controlled oscillator from said phase lock circuit during said first period, whereby said voltage controlled oscillator provides said given frequency for said drive means during said first period and is part of the tracking means in said second period.

8. The system of claim 5 wherein said tracking means includes a second phase lock circuit for accurately tracking a substantially greater frequency range than said first phase lock circuit, and wherein said tracking detecting means is connected to said first and second phase lock circuits to detect if said first phase lock circuit is tracking said vibrating frequency.

9. The system of claim 1 wherein said wire and said coil are remote from the system and said vibration detecting means includes an amplifier connected to said coil for monitoring said coil during said second period, a filter in series with said amplifier, and a level detector in series with said filter.

10. A device for measuring the natural frequency of a wire under tension comprising:
means for magnetically plucking said wire;
means for detecting mechanical vibration of said wire;
a phase lock loop circuit connected to said vibration detecting means for tracking mechanical vibration in a given frequency band about a selected frequency;
a voltage controlled oscillator;
means connected to said voltage controlled oscillator for connecting said voltage controlled oscillator to said plucking means during a first period and for connecting said voltage controlled oscillator to said phase lock loop circuit for tracking during a second period; and
means connected to said voltage controlled oscillator for indicating the tracked frequency.

11. The device of claim 10 including means connected to said voltage controlled oscillator for manually adjusting said selected frequency and means connected to said voltage controlled oscillator for storing the tracked frequency of said detected mechanical vibration during said second period for use as said selected frequency during a subsequent first period.

12. The device of claim 11 including means connected to said phase lock loop circuit for detecting if said phase lock loop circuit is tracking, and means connected to said tracking detecting means for activating said storing means.

13. The device of claim 12 including means connected to said tracking detecting means for preventing activation of said indicator means until tracking during three consecutive second periods have been detected.

* * * * *